United States Patent [19]

Suzuki

[11] Patent Number: 4,551,971
[45] Date of Patent: Nov. 12, 1985

[54] BOOSTING APPARATUS FOR TURBO-JET ENGINE

[76] Inventor: Satoru Suzuki, 1 Mikatabara-Cho 536 Banchi, Hamamatsu-Shi, Shizuoka-pref., Japan

[21] Appl. No.: 607,236

[22] Filed: May 4, 1984

[30] Foreign Application Priority Data

May 14, 1983 [JP]   Japan ............................ 58-72114[U]

[51] Int. Cl.⁴ .............................................. F02K 3/10
[52] U.S. Cl. ...................................... 60/39.53; 60/261
[58] Field of Search ................... 60/261, 39.05, 39.53, 60/39.54, 39.55, 39.58, 39.59, 39.464, 39.461

[56] References Cited

U.S. PATENT DOCUMENTS

| | | | |
|---|---|---|---|
| 2,804,241 | 8/1957 | McDowall et al. | 60/261 |
| 2,944,388 | 7/1960 | Bayer | 60/261 |
| 3,327,480 | 6/1967 | Gunter | 60/39.59 |
| 3,396,538 | 8/1968 | Wetherbee | 60/39.59 |
| 3,826,080 | 7/1974 | DeCorso et al. | 60/39.55 |
| 3,921,389 | 11/1975 | Kawaguchi . | |

OTHER PUBLICATIONS

Naegeli et al., *Fuel Microemulsions for Jet Engine Smoke Reduction*, Journal of Engineering for Power, Jan. 1983.

*Primary Examiner*—Louis J. Casaregola
*Attorney, Agent, or Firm*—McAulay, Fields, Fisher, Goldstein & Nissen

[57] ABSTRACT

A boosting apparatus for temporarily increasing the power of a turbo-jet engine having a compressor, combustor gas turbine rotor, and an after burner. The apparatus comprises a means for atomizing a mixture of a fuel and an aqueous solution of methanol.

2 Claims, 1 Drawing Figure

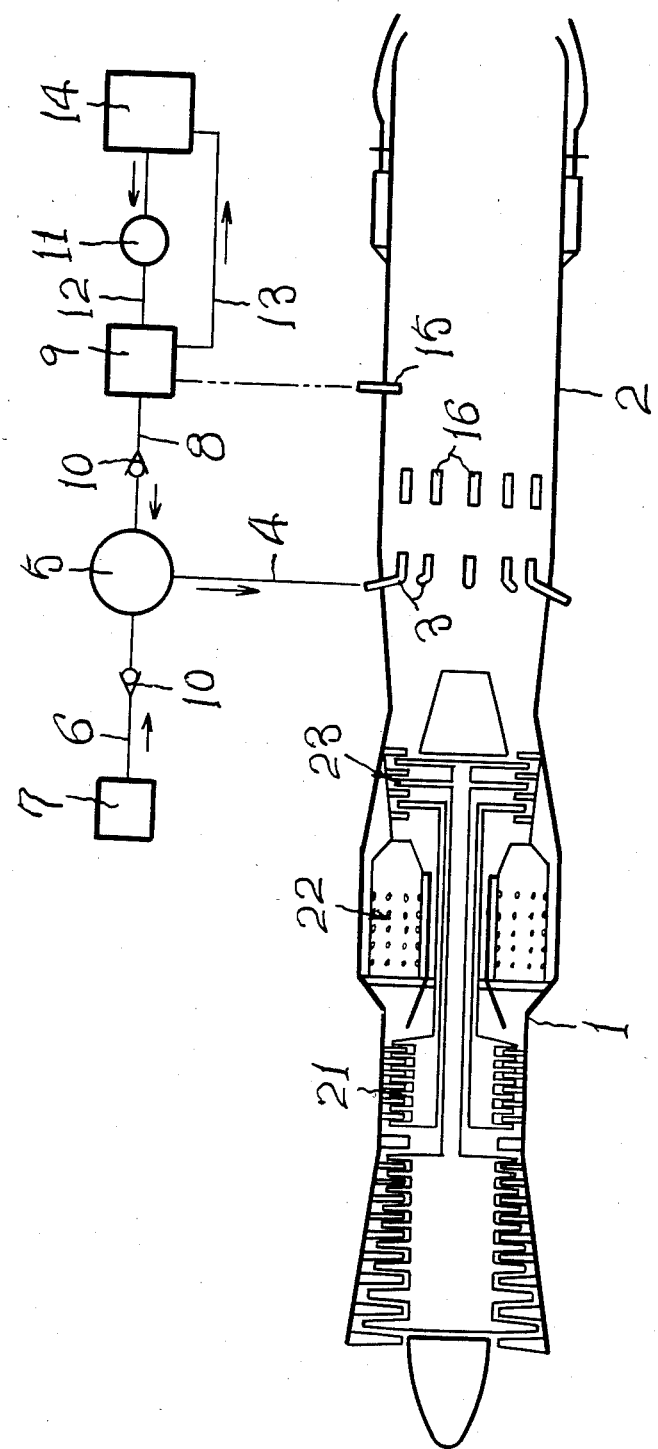

BOOSTING APPARATUS FOR TURBO-JET ENGINE

BACKGROUND OF THE INVENTION

Field of the Invention

The present invention broadly relates to a turbo-jet engine in which the exhaust gas from a gas turbine is utilized as a gas jet which produces a reactional force for propelling an airplane and, more particularly, to a boosting apparatus for turbo-jet engine which is adapted to temporarily increase the jet energy of the gas jet to produce a boosting power when such a boosting is required as in the case of taking off of the airplane or acceleration of the same from subsonic speed to supersonic speed.

Description of the Prior Art:

In general, a turbo-jet engine for airplane is required to temporarily increase its output power at the time of take-off of the airplane or acceleration from a subsonic speed to a supersonic speed. This boosting is generally achieved by injecting an aqueous slution of methanol into the engine or by using an after burner.

More specifically, in the first-mentioned method, the aqueous solution of methanol is injected into and atomized through the compressor or combustor of the gas turbine. The atomized aqueous solution is then evaporated by the heat of the intake air so that the temperature of the intake air is lowered to increase the density of the same. As a result, the engine is charged with greater amount of intake air which in turn allows the combustion of greater amount of fuel, thereby to increase the power of the engine. This method, however, suffers from the following drawbacks. Namely, in order to prevent any contamination or corrosion of the parts of the turbo-jet engine by the atomized aqueous solution of methanol, it is necessary to use a specially prepared water or aqueous solution having a high purity.

In the second-mentioned method, fuel is injected into the after burner to cause a secondary combustion thereby to increase the power of the engine. This method, however, encounters problems such as an impractically large fuel consumption and noises of very high levels to seriously deteriorate the environmental condition. For these reasons, the second-mentioned method employing an after burner cannot be used in turbo-jet engines for ordinary jet planes which are designed to cruise at subsonic speed.

SUMMARY OF THE INVENTION

Object of the Invention

Accordingly, it is a primary object of the invention to provide a boosting apparatus for a turbo-jet engine, capable of overcoming the above-described problems of the prior art.

Brief Summary of the Invention:

To this end, according to the invention, there is provided, in a turbo-jet engine having a gas turbine including a compressor, combustor and a gas turbine rotor, and an after burner connected to the downstream side of said gas turbine as viewed in the direction of flow of the combustion gas, a boosting apparatus for the turbo-jet engine comprising a means for atomizing a mixture of a fuel and an aqueous solution of methanol into the after burner.

Since the mixture is not supplied to the compressor nor to the combustion chamber but to the after burner, the aforementioned contamination and corrosion of the parts of the gas turbine is avoided. In addition, since the fuel is supplied to the after burner together with the aqueous solution of methanol, the generation of noise is effectively suppressed and the fuel consumption is decreased advantageously.

Other objects, features and advantages of the invention will become clear from the following description of the preferred embodiments taken in conjunction with the accompanying drawing.

BRIEF DESCRIPTION OF THE DRAWING

The attached sole Figure is a schematic sectional view of a turbo-jet engine having a boosting apparatus in accordance with the invention.

DESCRIPTION OF THE PREFERRED EMBODIMENT

Referring to the sole Figure attached, a turbo-jet engine incorporating a boosting apparatus embodying the present invention has a gas turbine 1 which includes, as well known to those skilled in the art, a compressor 21, a combustor 22 and a gas turbine rotor 23. The turbo-jet engine further has an after burner duct 2 connected to the downstream end of the gas turbine 1 as viewed in the direction of flow of the gas. A fuel atomizing nozzle 3 projected into the after burner duct 2 is connected to a mixing tank 5 through a first relay pipe 4. The mixing tank 5 in turn is connected to a fuel tank 7 through a second relay pipe 6 and also to a flow-rate regulator 9 through a third relay pipe 8. The second and the third relay pipes 6 and 8 are provided at their intermediate portions with check valves 10 and 10 which are adapted to allow respective fluids to flow only toward the mixing tank 5. The flow-rate regulator 9 is connected to a solution tank 14 which contains an aqueous solution of methanol, through a fourth relay pipe 12 provided at its intermediate portion with a pump 11 and also through a return pipe 13.

In operation, the aqueous solution of methanol in the solution tank 14 is supplied by the pump 11 into the mixing tank 5 through the flow-rate regulator 9 at a suitable flow rate which is regulated by the flow-rate regulator 9. The aqueous solution is then mixed in the mixing tank 5 with the fuel which also is supplied to the mixing tank 5 from the fuel tank 7. The mixture of the fuel and the aqueous solution of methanol is then atomized from the atomizing nozzle 3 into the hot exhaust gas flowing through the after burner duct 2 so that the exhaust gas which still contains combustible matter is burnt together with the fuel to increase the power of the gas jet from the turbo-jet engine. The flame produced as a result of the combustion is stably held by a flame holder 16. On the other hand, the aqueous solution of the methanol is evaporated instantaneously and is dispersed in the form of numerous vapor particles over the entire region of the after burner duct 2. The vapor particles thus spread effectively serve as the sound absorber so as to suppress the generation of noise in the after burner duct 2.

A reference numeral 15 denotes a temperature detector which cooperates with the flow-rate regulator 9 upon sensing the temperature in the after burner duct 2 which generally ranges between 300° and 400° C., thereby to optimize the rate of supply of the aqueous solution of the methanol to the mixing tank 5. Any excessive amount of aqueous solution of methanol supplied to the flow-rate regulator 9 is returned to the solution tank 14 through the return pipe 13.

Although the invention has been described through specific terms, it is to be noted here that the described embodiment is not exclusive and various changes and modifications may be imparted thereto without departing from the scope of the invention which is limited solely by the appended claims.

What is claimed is:

1. In a turbo-jet engine having a gas turbine including a compressor, combustor and a gas turbine rotor, and an after burner connected to the downstream side of said gas turbine as viewed in the direction of flow of the combustion gas, a boosting apparatus for the turbo-jet engine characterized by comprising a means for atomizing a mixture of a fuel and an aqueous solution of methanol only into said after burner.

2. A boosting apparatus as set forth in claim 1, wherein said means for atomizing said mixture includes a solution tank containing said aqueous solution, a mixing tank connected to said solution tank through a passage having a flow-rate regulator, a fuel tank connected to said mixing tank, and an atomizing nozzle connected to said mixing tank and adapted to inject said mixture only into said after burner.

* * * * *